(12) United States Patent  
Maier

(10) Patent No.: US 8,789,365 B2
(45) Date of Patent: Jul. 29, 2014

(54) ENERGY CONVERSION SYSTEM WITH SELF-RECTIFYING RADIAL FLOW TURBINE AND METHOD

(75) Inventor: William C. Maier, Almond, NY (US)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 13/635,927

(22) PCT Filed: Mar. 22, 2010

(86) PCT No.: PCT/US2010/028176
§ 371 (c)(1),
(2), (4) Date: Oct. 10, 2012

(87) PCT Pub. No.: WO2011/119144
PCT Pub. Date: Sep. 29, 2011

(65) Prior Publication Data
US 2013/0192219 A1    Aug. 1, 2013

(51) Int. Cl.
*F03B 17/02* (2006.01)
(52) U.S. Cl.
USPC .......................................... 60/495; 415/199.2
(58) Field of Classification Search
USPC ............ 60/495–507, 398; 290/53–54, 42–43; 415/7, 100, 147, 149.1, 156, 199.2
See application file for complete search history.

(56) References Cited

U.S. PATENT DOCUMENTS

| | | | |
|---|---|---|---|
| 1,339,211 A * | 5/1920 | McKerahan | 494/60 |
| 2,897,917 A * | 8/1959 | Hunter | 55/404 |
| 3,064,137 A | 11/1962 | Corbett, Jr. et al. | |
| 3,307,587 A | 7/1967 | Rylatt | |
| 4,221,538 A | 9/1980 | Wells | |
| 4,313,711 A | 2/1982 | Lee | |
| 4,327,296 A * | 4/1982 | Weyers | 290/53 |
| 4,441,316 A | 4/1984 | Moody | |
| 4,719,754 A | 1/1988 | Nishikawa | |
| 4,767,267 A | 8/1988 | Salt et al. | |
| 4,917,571 A * | 4/1990 | Hyll et al. | 415/197 |
| 6,360,534 B1 | 3/2002 | Denniss | |

FOREIGN PATENT DOCUMENTS

WO    2011/119144 A1    9/2011

OTHER PUBLICATIONS

PCT/US2010/028176—International Search Report and Written Opinion dated May 14, 2010 (8 pages).
PCT/US2010/028176—International Preliminary Report on Patentability dated Aug. 4, 2011 (8 pages.).

* cited by examiner

*Primary Examiner* — Kenneth Bomberg
*Assistant Examiner* — Wesley Harris
(74) *Attorney, Agent, or Firm* — Edmonds & Nolte, PC

(57) ABSTRACT

An energy conversion system is provided including an annular member disposed around a shaft and at least partially defining a first radial flow passage that is fluidly coupled to a wave chamber and a second radial flow passage that is fluidly coupled to a port. A first plurality of nozzle vanes may extend at least partially through the first radial flow passage and may be configured to impart a first exit swirl angle in a fluid. A second plurality of nozzle vanes may extend at least partially through the second radial flow passage and may be configured to impart a second exit swirl angle in the fluid. A turbine wheel may be coupled to the shaft and disposed radially between the shaft and the annular member. The turbine wheel may define an axial flow passage fluidly coupled to the first and second radial flow passages and may include impulse blades.

23 Claims, 7 Drawing Sheets

ENERGY CONVERSION SYSTEM WITH
SELF-RECTIFYING RADIAL FLOW
TURBINE AND METHOD

CROSS REFERENCE TO RELATED
APPLICATIONS

This application is a United States national stage application of PCT Patent Application No. PCT/US2010/028176, filed Mar. 22, 2010, the disclosure of which is incorporated herein by reference in its entirety to the extent consistent with the present disclosure.

The present application is a national stage application of PCT Pat. App. No. PCT/US2010/028176 filed Mar. 22, 2010. The priority application is hereby incorporated by reference in its entirety into the present application.

BACKGROUND

This disclosure relates in general to energy conversion; more particularly, this disclosure relates to conversion of ocean wave energy into rotational shaft energy.

To convert wave energy into rotational shaft energy, a wave turbine may include a wave chamber coupled to an air turbine, with the wave chamber partially submerged in a body of water to provide an oscillating water column therein. In response to wave action of the body of water, the oscillating water column rises and falls, acting as a piston by pushing and pulling air, or another operating fluid, into and out of the wave chamber. A challenge to implementing such wave turbines is efficiently converting the energy of such a bi-directional flow of fluid into useful mechanical energy.

Most turbines are designed to accept flow in a single direction, and are optimized to direct the flow using stator vanes, which channel the fluid to impact and/or progress between turbine blades at a desired flow angle. However, in the case of the wave turbine complex networks of valves are required to avoid drag losses during the "backward" flow. Unfortunately, these complex valve networks increase the complexity of the wave turbine, which can result in increased capital and operating expense; and can make the wave turbine more susceptible to component failure.

One way to avoid such valve networks is to use a bi-directional turbine, one example of which is a Wells turbine. In a Wells turbine, the blades are configured to receive the bi-directional flow to continuously rotate a shaft. Bi-directional flow, however, inhibits optimization, and as such, the efficiency and power output of Wells turbines is generally limited. This requires the turbines to be larger than desired, again resulting in increased capital and operating expenses.

Therefore, what is needed is an energy conversion system and method that overcomes one or more of the challenges described above.

SUMMARY

Embodiments of the present disclosure may provide an exemplary energy conversion system. The exemplary energy conversion system may include an annular member disposed around a shaft and at least partially defining a first radial flow passage that has a decreasing radius and is fluidly coupled to a wave chamber and a second radial flow passage that has an increasing radius and is fluidly coupled to a port. The exemplary energy conversion system may also include a first plurality of nozzle vanes disposed around the shaft and extending at least partially through the first radial flow passage, the first plurality of nozzle vanes being configured to impart a first exit swirl angle in a fluid as the fluid proceeds from the wave chamber through the first radial flow passage. The exemplary energy conversion system may further include a turbine wheel coupled to the shaft, disposed radially between the shaft and the annular member, defining an axial flow passage that is fluidly coupled to the first and second radial flow passages, and including a first plurality of impulse blades disposed around the shaft, the first plurality of impulse blades being configured to receive the fluid from the first radial flow passage. The exemplary energy conversion system may also include a second plurality of nozzle vanes disposed around the shaft and extending at least partially through the second radial flow passage, the second plurality of nozzle vanes being configured to impart a second exit swirl angle in the fluid as the fluid proceeds through the second radial flow passage.

Embodiments of the present disclosure may also provide an exemplary method of rotating a shaft. The exemplary method may include directing a fluid from a wave chamber through a first radial flow passage having a decreasing radius, and swirling the fluid while directing the fluid through the first radial flow passage. The exemplary method may also include directing the fluid between a first plurality of impulse turbine blades coupled to the shaft, and turning the fluid in an axial flow passage after directing the fluid between the first plurality of impulse turbine blades. The exemplary method may also include directing the fluid between a second plurality of impulse turbine blades coupled to the shaft after turning the fluid, and directing the fluid from the second plurality of impulse turbine blades through a second radial flow passage having an increasing radius.

Embodiments of the present disclosure may further provide an exemplary apparatus for converting energy in an oscillating fluid flow into rotational energy. The exemplary apparatus may include a base disposed proximal a wave chamber, and a cap having an outer circumference and being spaced apart from the base. The exemplary apparatus may also include a turbine wheel attached to a shaft and disposed between the cap and the base, the turbine wheel having first and second rows of impulse turbine blades and a plurality of turning vanes, the first and second rows of impulse turbine blades being separated axially apart, the turbine wheel defining an axial flow passage extending between the first and second rows of impulse blades, and the plurality of turning vanes extending at least partially through the axial flow passage. The exemplary apparatus may further include an annular member disposed around the turbine wheel and having first and second members that converge together proximal the turbine wheel, the first member and the cap at least partially defining a first radial flow passage extending from the outer circumference of the cap to the turbine wheel, the second member at least partially defining a second radial flow passage extending from the wave chamber to the turbine wheel. The exemplary apparatus may further include a first plurality of nozzle vanes coupled to the cap and the first member of the annular member and spanning the first radial flow passage, the first plurality of nozzle vanes being substantially rectilinear.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
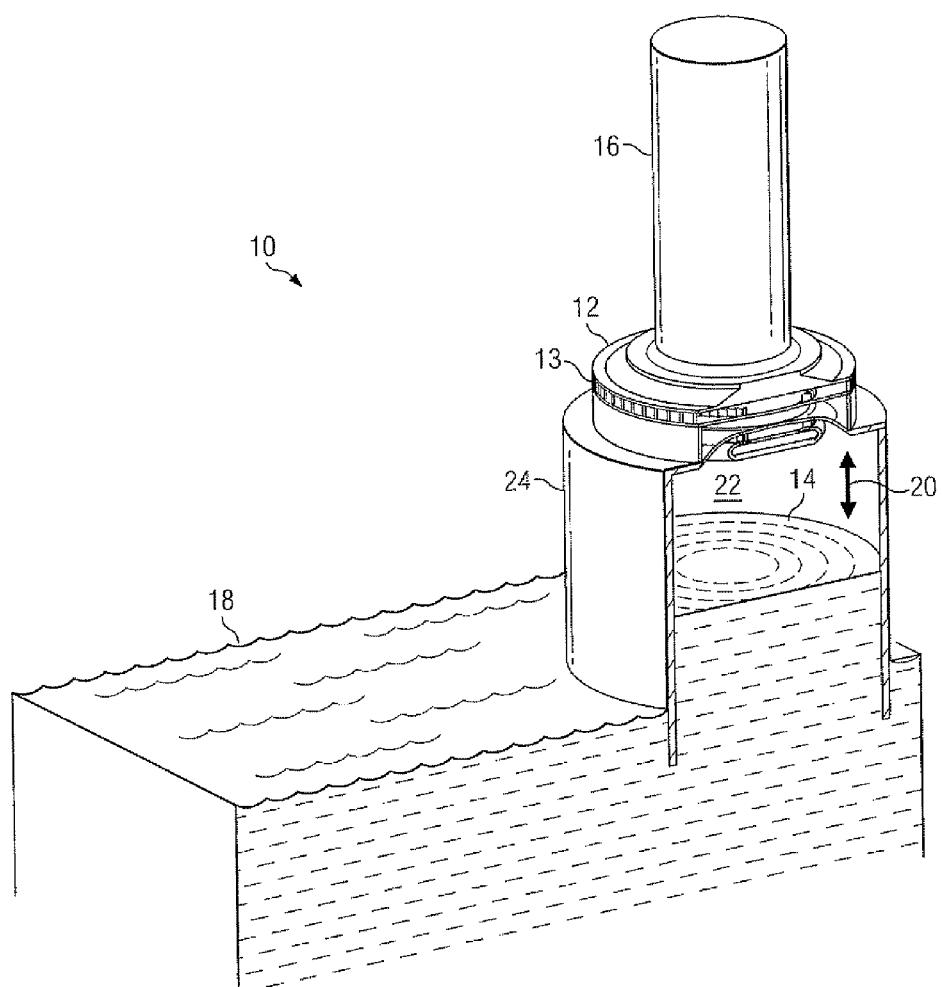
FIG. 1 is a perspective view an exemplary energy conversion system, in accordance with the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims, the term "or" is intended to encompass both exclusive and inclusive cases, i.e., "A or B" is intended to be synonymous with "at least one of A and B," unless otherwise expressly specified herein.

FIG. 1 illustrates an energy conversion system 10, which may include a radial turbine system 12 that utilizes an oscillating fluid column, such as an oscillating water column ("OWC") 14. In one or more embodiments, a generator 16 may be operably coupled to the radial turbine system 12; however, in other embodiments, the radial turbine system 12 may be coupled to a compressor (not shown) or any other device that can usefully receive rotational energy. The OWC 14 may be part of a body of water 18, such as an ocean or lake, the movement of which causes the OWC 14 to oscillate vertically, rising and falling as indicated by arrow 20. The OWC 14 oscillates in a wave chamber 22 defined by a generally tubular structure 24, thereby acting as a piston to drive a motive fluid, such as air in the vacant area of the wave chamber 22 above the OWC 14, through the radial turbine system 12, and into or out of a radial port 13.

Figure 2:
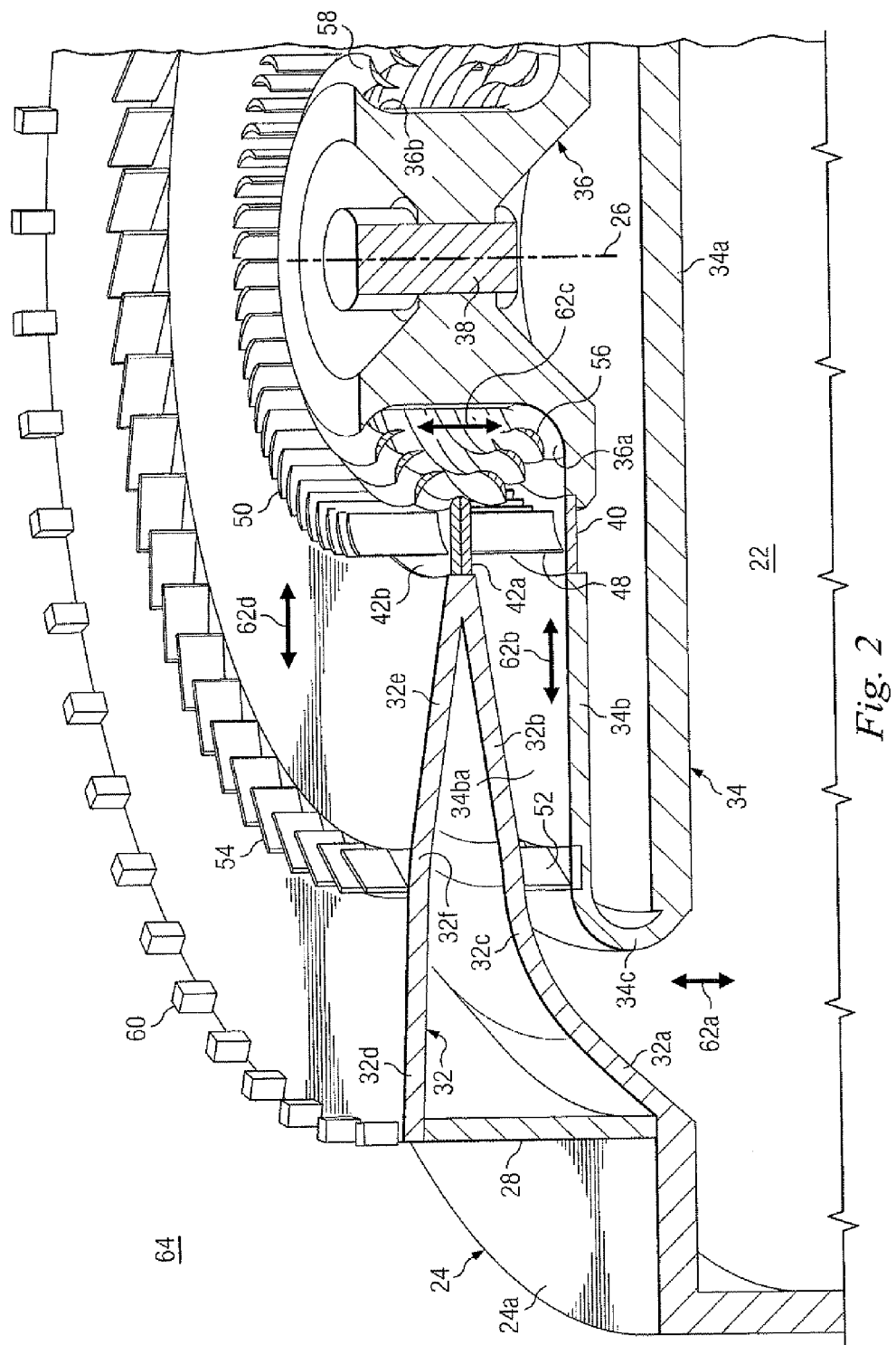
FIG. 2 is a perspective view of a section of the energy conversion system, in accordance with the disclosure.
Figure 3:
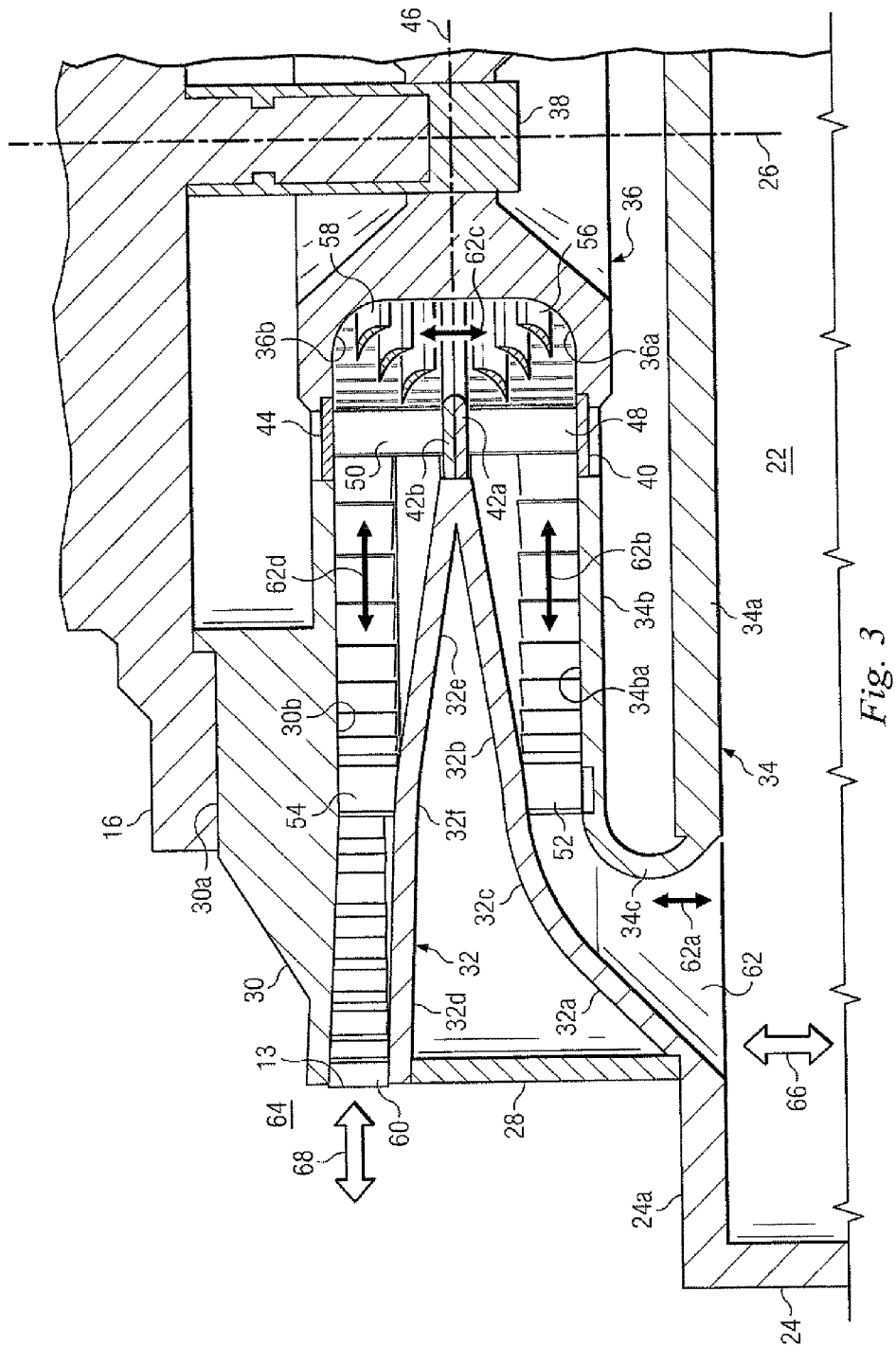
FIG. 3 is a sectional view of a portion of the energy conversion system, in accordance with the disclosure.

FIGS. 2 and 3, with additional reference to FIG. 1, illustrate an exemplary embodiment of the radial turbine system 12. The radial turbine system 12 may define a vertically-extending center axis 26 along which a shaft 38 is disposed, and may include an annular housing 28 extending upward from an annular top portion 24a of the tubular structure 24. A cap 30 (FIG. 3) may be axially spaced from the upper end of the annular housing 28, may define a horizontally-extending upper surface 30a on which the generator 16 (FIG. 1) is mounted, and may also define a horizontally-extending lower surface 30b. As any directional terms, such as "upper," "lower," "vertical," or "horizontal" are used herein, they generally refer merely to a relative position or direction of one component with respect to another. It will thus be appreciated that a change in orientation of the entire system will not affect such relative positioning between components, and is thus within the scope of this disclosure.

An annular member 32 may be disposed around the shaft 38 and may extend radially-inward from the annular housing 28. The annular member 32 may include a lower, outer angularly-extending portion 32a, a lower, inner angularly-extending portion 32b, and curved transition portion 32c extending therebetween. The annular member 32 may further include an upper, outer angularly-extending portion 32d, an upper, inner angularly-extending portion 32e, and an angled transition portion 32f extending therebetween. The upper, inner angularly-extending portion 32e and the lower, inner angularly-extending portion 32b may converge proceeding radially-inward and may meet at the radially-inward terminus of the annular member 32.

In one or more embodiments, the radial turbine system 12 may also include a base 34. The base 34 may include a lower disk 34a positioned so that the annular top portion 24a of the tubular structure 24 may generally extend around, and may be generally concentric with, the lower disk 34a. An upper, annular disk member 34b may be axially spaced from the disk 34a and may define a horizontally-extending surface 34ba. An annular curved portion 34c extends between, and around, the lower disk 34a and the upper, annular disk member 34b.

The radial turbine system 12 may also include a turbine wheel 36 disposed around and coupled to the shaft 38, such that the annular member 32 is disposed around the turbine wheel 36. The shaft 38 may be centrally-located in the radial turbine system 12, such that the shaft 38 is longitudinally disposed along the vertically-extending center axis 26. A base ring 40 may be coupled to, and extend around, a lower portion of the turbine wheel 36. The base ring 40 may be positioned so that the upper, annular disk member 34b of the base 34 extends around the base ring 40. A lower, middle ring 42a and an upper, middle ring 42b of the turbine wheel 36 may be disposed generally axially adjacent to one another and may extend around the turbine wheel 36, with the middle rings 42a and 42b being positioned so that the radially-inward terminus of the annular member 32 extends around the middle rings 42a and 42b. In an exemplary embodiment, the middle rings 42a and 42b are fixedly coupled to one another. A top ring 44 (FIG. 3) may be coupled to, and extend around, the upper portion of the turbine wheel 36, with the top ring 44 being positioned so that the cap 30 of the radial turbine system 12 extends around the top ring 44.

A plurality of lower turbine blades 48 may be coupled to the base ring 40, and to the lower, middle ring 42a. The lower turbine blades 48 may extend axially between the base ring 40 and the middle ring 42a. The lower turbine blades 48 may be spaced around the turbine wheel 36, collectively defining a generally circular row of blades therearound. Similarly, a plurality of upper turbine blades 50 may be coupled to the upper, middle ring 42b and to the top ring 44 (FIG. 3). The upper turbine blades 50 may extend axially between the middle ring 42b and the top ring 44. The upper turbine blades 50 may also be spaced around the turbine wheel 36, collectively defining a generally circular row of blades therearound. A horizontally-extending plane 46 may be defined between the middle rings 42a and 42b, and may be perpendicular to the vertically-extending center axis 26. In one or more embodiments, the lower turbine blades 48 may be identical to the upper turbine blades 50, having the same radial and angular orientation as the upper turbine blades 50, but at a different axial location relative to the center axis 26.

A plurality of lower radial nozzle vanes 52 may be coupled to the annular disk member 34b of the base 34, and to the radially-inward terminus portion of the curved transition portion 32c of the annular member 32. The plurality of lower radial nozzle vanes 52 may extend axially between the base 34 and the annular member 32, with the lower radial nozzle vanes 52 being radially positioned outside of the lower turbine blades 48 and spaced circumferentially therearound. Similarly, a plurality of upper radial nozzle vanes 54 may be coupled to the angled transition portion 32f of the annular member 32, and to the cap 30. The upper radial nozzle vanes 54 may extend axially between the annular member 32 and the cap 30 (FIG. 3), with the upper radial nozzle vanes 54 being radially positioned outside of the upper turbine blades 48. The lower radial nozzle vanes 52 may be identical to the upper radial nozzle vanes 54.

In one or more embodiments, the upper and lower nozzle vanes 52, 54 may be disposed at an angle relative to a radius extending from the shaft 38. In one or more embodiments, the angles of the upper and lower nozzle vanes 52, 54 may be substantially equal, as can be best appreciated from FIG. 2. Furthermore, in one or more embodiments, from the perspective of fluid travelling through the flow passage 62a-d, the upper and lower nozzle vanes 52, 54 may be identical to each other, as described above with reference to the upper and lower turbine blades 48, 50. Additionally, in an exemplary embodiment, the upper and/or lower radial nozzle vanes 52, 54 may have a relatively high loading coefficient, on the order of a Zweifel number ranging from about 1 to about 1.2. As the term is used herein, Zweifel number refers to the ratio of tangential forces used as an initial estimate in determining the minimum solidity and number of the upper and/or lower radial nozzle vanes 52, 54.

A plurality of lower turning vanes 56 may be coupled to, and extend around, the turbine wheel 36. In one or more embodiments, each lower turning vane 56 may include multiple arcuate segments or may be a single annular vane. The lower turning vanes 56 may be disposed at generally the same axial location as the lower turbine blades 48, and positioned radially between the turbine wheel 36 and the lower turbine blades 48. The lower turning vanes 56 may cascade vertically, and may be adapted to turn the motive fluid flow from a radial direction to an axial direction, and vice versa. Similarly, a plurality of upper turning vanes 58 may be coupled to, and extend around, the turbine wheel 36. The upper turning vanes 58 may be disposed at generally the same axial location as the upper turbine blades 50, and positioned radially between the turbine wheel 36 and the upper turbine blades 50. The upper turning vanes 58 may cascade vertically, and may be adapted to turn the direction of motive fluid flow from an axial direction to a radial direction, and vice versa.

A plurality of support posts 60 may extend axially between the cap 30 (FIG. 3) and the upper, outer angularly-extending portion 32d of the annular member 32, proximal the radial port 13. The support posts 60 may be spaced around the vertically-extending center axis 26. The support posts 60 may be elongated, tapered aerofoils, for example, or may be simple cylinders or rectilinear supports, as shown. In one or more embodiments, the support posts 60 may instead be a screen or the like.

A flow passage 62a-d including a lower axial flow portion 62a, a lower radial flow portion 62b, a middle axial flow portion 62c, and an upper radial flow portion 62d may be defined by the radial turbine system 12. The lower axial flow portion 62a may be defined between a radially-outward terminus of the lower disk 34a and a lower end of the lower, outer angularly-extending portion 32a of the annular member 32. The lower radial flow portion 62b may be defined between the annular disk member 34b and the lower, inner angularly-extending portion 32b of the annular member 32. The middle axial flow portion 62c may be defined between the turbine wheel 36 and the upper and lower turbine blades 48 and 50. The upper radial flow portion 62d may be defined between the cap 30 (FIG. 3) and the upper, inner angularly-extending portion 32e of the annular member 32, and may extend from the radial port 13 radially toward the turbine wheel 36. The upper radial flow portion 62d may be axially spaced from the lower radial flow portion 62b. The middle axial flow portion 62c may be radially positioned between the shaft 38 and each of the radial flow portions 62b and 62d. The lower radial flow portion 62b may be in fluid communication with the middle axial flow portion 62c, which may be in fluid communication with the upper radial flow portion 62d. The lower axial flow portion 62a may be axially positioned between the lower radial flow portion 62b and the wave chamber 22, radially positioned so that the lower radial flow portion 62b may be radially positioned between the middle axial flow portion 62c and the lower axial flow portion 62a. The lower radial flow portion 62b may be in fluid communication with the lower axial flow portion 62a, which may be in fluid communication with the wave chamber 22.

In one or more embodiments, the wave chamber 22 may be in fluid communication with a fluidic environment 64 via the flow passage 62a-d. The fluidic environment 64 may be contained in an expandable bladder (not shown), other structures (not shown), or may be the ambient atmosphere surrounding the radial turbine system 12. Moreover, bi-directional motive fluid flow between the wave chamber 22 and the fluidic environment 64 is permitted via the flow portions 62a-d, as indicated by the bi-directional arrows designating the lower axial flow portion 62a, the lower radial flow portion 62b, the middle axial flow portion 62c, and the upper radial flow portion 62d, of the flow passage.

Figure 4:
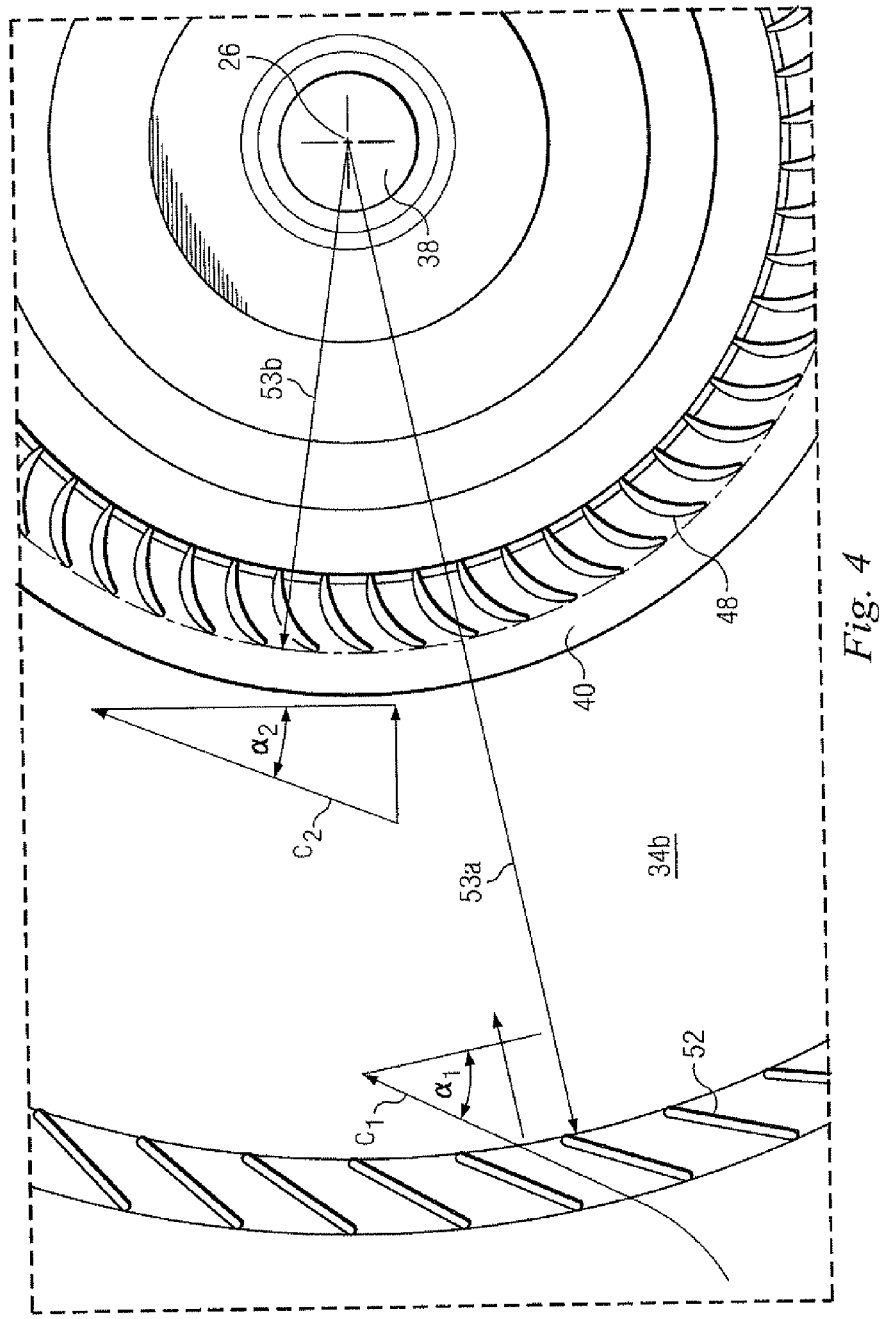
FIG. 4 is a plan view of a portion of an exemplary radial turbine system that may be used in the energy conversion system, in accordance with the disclosure.

With additional reference to FIGS. 2 and 3, FIG. 4 illustrates a plan view of a portion of the radial turbine system 12, illustrating a portion of the lower radial flow portion 62b, according to one or more embodiments. Each of the lower turbine blades 48 may include a two-dimensional prismatic section, which may be shaped to be one half of a symmetric, generally crescent-shaped, impulse-style turbine blade or "bucket." Although not shown, in one or more embodiments where the upper and lower turbine blades 48, 50 are symmetric, as described above, each of the upper turbine blades 50 also includes a two-dimensional prismatic section that is shaped to be one half of a symmetric, impulse-style turbine blade. In an exemplary embodiment, each of the blades 48, 50 has a turning angle, which is generally defined herein as the change in the slope of the blade 48, 50 proceeding radially inward along the blade 48, 50. In one or more embodiments, the turning angle of each blade 48, 50 may be from about 50 degrees to about 70 degrees, or, for example, about 60 degrees.

In an exemplary embodiment, each of the lower radial nozzle vanes 52 also includes a two-dimensional rectangular prismatic section, and may have, for example, radiused leading and trailing edges. In an exemplary embodiment, the lower radial nozzle vanes 52 have an exit angle that ranges from about 20 degrees to about 30 degrees, as will be described in further detail below. The nozzle vanes 52 may be offset from the center axis 26 such that they define a radius 53a from the vertically-extending center axis 26, which is about two times a radius 53b defined by the radial distance between the center axis 26 and the plurality of lower turbine blades 48.

Referring now to FIGS. 1-4, in exemplary operation, wave motion occurs in the body of water 18 causing the OWC 14 to oscillate, that is, rise and fall, within the wave chamber 22. When the oscillating OWC 14 rises, a motive fluid such as, for example, air, within the wave chamber 22 is compressed, causing the air to flow into the lower axial flow portion 62a of the flow passage 62a-d. The motive fluid continues to flow between the annular curved portion 34c of the base 34 and the lower, outer angularly-extending portion 32a of the annular member 32, thereby causing the air to turn from flowing in an axial direction to flowing in an inwardly radial direction. The annular curved portion 34c of the base 34 and the lower, outer angularly-extending portion 32a of the annular member 32 may serve as flared endwalls of the flow passage.

During or after turning to flow in a radial direction, the motive fluid may flow between the lower radial nozzle vanes 52 at a velocity $C_1$ and an exit swirl angle $\alpha_1$, as shown in FIG. 4. The exit swirl angle $\alpha_1$ is generally defined to mean the angle the fluid trajectory vector makes with respect to a line tangent to a cylinder concentric with the center axis 26. As such, the lower radial nozzle vanes 52 are configured to impart a swirl in the fluid. "Swirl" as it is used herein is generally defined to mean the circumferential component of the velocity.

In an exemplary embodiment, due at least in part to the relatively large exit swirl angle $\alpha_1$ of the motive fluid proximal the lower radial nozzle vanes 52 and to the generally pure radial orientation of the flow passages between the lower nozzle vanes 52, a relatively small efficiency loss is incurred by the use of relatively simplified two-dimensional rectangular prismatic sections for the lower radial nozzle vanes 52. Further, in several exemplary embodiments, any losses therein may be at least offset by the lower losses incurred by the flow of the motive fluid through the upper radial nozzle vanes 54 (described below).

Referring particularly to FIGS. 2 and 3, the motive fluid continues to swirl (i.e., flow in the circumferential direction) and flow radially-inward to the lower turbine blades 48 via the lower radial flow portion 62b of the flow passage 62. The endwalls of the flowpath between the exit of the lower radial nozzle vanes 52 and the turbine blades 48 may be contoured to achieve approximately constant radial velocity. In an exemplary embodiment, the flowpath areas of the lower radial flow portion 62b of the flow passage may be approximately constant at all radial locations between the exit of the nozzle vanes 52 and the inlet of the turbine blades 48, thereby substantially avoiding radial acceleration. For example, the lower radial flow portion 62b may increase in thickness to offset the reduced circumference proceeding radially-inward.

As shown in FIG. 4, the motive fluid may proceed toward the lower turbine blades 48 at an increased velocity $C_2$, due to the decreased radius, and at an inlet swirl angle $\alpha_2$ and then flow between the lower turbine blades 48. The lower turbine blades 48 turn from the inlet swirl angle $\alpha_2$ to, for example, a radially-inward direction toward the central axis 26. As a consequence of the fluid being turned by the blade 48, the lower turbine blades 48 are urged in the circumferential direction, thereby rotating the turbine wheel 36 and the shaft 38.

Due to the vortical nature of the swirling motive fluid between the lower radial nozzle vanes 52 and the lower turbine blades 48, the tangential components of the velocity of the motive fluid increases as the radius of the flowpath 62b (FIG. 2) decreases, due to the conservation of angular momentum. As such, the ratio of the circumferential component of the velocity $C_1$ to the circumferential component of the velocity $C_2$ increases is proportionally to the ratio of the radius 53a to the radius 53b. In an exemplary embodiment, the ratio of the radius 53a to the radius 53b is about 2:1. As a result, the inlet swirl angle $\alpha_2$ may be less than the exit swirl angle $\alpha_1$, thereby providing a high degree of incidence of the motive fluid on the blades 48. In an exemplary embodiment, the ratio of the radius 53a to the radius 53b is about 2:1, the exit swirl angle $\alpha_1$ ranges from about 20 degrees to about 30 degrees, and the inlet swirl angle $\alpha_2$ ranges from about 10 degrees to about 15 degrees.

Referring again particularly to FIGS. 2 and 3, after the motive fluid exits the lower turbine blades 48, the motive flows between the lower turning vanes 56, causing the motive fluid to turn from flowing in an inwardly radial direction to flowing in an axially upward direction. The turbine wheel 36 may include a fillet 36a that is shaped to efficiently promote this turn from a radial to an axial direction. The motive fluid flows axially upward via the middle axial flow portion 62c of the flow passage and then between the upper turning vanes 58, causing the motive fluid to turn from flowing in the axial upward direction to flowing in an outwardly radial direction. The turbine wheel 36 may include another fillet 36b, which may be shaped to promote a turn from an axial to a radial direction.

After turning to flow in an outward radial direction, the motive fluid engages the upper turbine blades 50 and flows between them. In an exemplary embodiment, at design flow conditions, the upper turbine blades 50 may discharge the motive fluid substantially without swirl, i.e., in a radial direction without a significant circumferential component. The motive fluid flow through the turbine blades 50 further causes the turbine blades 50, and thus the turbine wheel 36, to continue to rotate around the vertically-extending center axis 26. As a result, the shaft 38 rotates. The lower turbine blades 48 and the upper and lower turning vanes 56 and 58 also continue to rotate along with the turbine wheel 36 and the shaft 38. In one or more other embodiments, however, the upper and lower turning vanes 56, 58 may remain stationary with respect to the rotating shaft 38 and turbine wheel 36.

After flowing past the upper turbine blades 50, the motive fluid flows radially-outward, increasing in radius toward the upper radial nozzle vanes 54 via the upper radial flow portion 62d. In an exemplary embodiment, the flow area in the upper radial flow portion 62d may be constant, similar to the described lower radial flow portion 62b, and thus the motive fluid may not undergo any significant change in radial velocity while flowing through the radial flow portion 62d. In an exemplary embodiment, when the radial turbine system 12 is running with off-design velocity ratios and/or off-design running conditions, any swirl left in the air flow in the upper radial flow portion 62d may be reduced due to the free vortex flow, achieving at least some degree of diffusion and efficiency-enhancement for the off-design velocity ratios and/or off-design running conditions.

During its radial outward flow through the radial flow portion 62d of the flow passage 62, the motive fluid may flow between the upper radial nozzle vanes 54, and any tangential component of its velocity may slow for the same reason it previously accelerated from $C_1$ to $C_2$. This deceleration reduces drag losses experienced in the reverse oriented upper radial nozzle vanes 54. Further, the reduced swirl and the large exit angle of each of the upper radial nozzle vanes 54 minimizes pressure loss due to incidence effects and turning of the motive fluid during its flow between the upper radial nozzle vanes 54. After exiting the upper radial nozzle vanes 54, the motive fluid may continue to flow radially-outward, exiting the radial turbine system 12 and being discharged into the environment 64.

The reverse or backflow of the energy conversion system 10 occurs when the OWC 14 falls, decreasing the pressure in the wave chamber 22. As a result of the drop in wave chamber 22 pressure, the motive fluid may be drawn into the radial turbine system 12 from the fluidic environment 64, and expelled therefrom into the wave chamber 22. As such, the motive fluid may enter the upper radial flow passage 52d, via the radial port 13, may be swirled by the upper radial nozzle vanes 54. For example, the upper radial nozzle vanes 54 may be angled to impart the same swirl direction at substantially the same exit swirl angle $\alpha_1$ (FIG. 4) as imparted by the lower radial nozzle vanes 52. The motive fluid may then engage the upper turbine blades 50, be turned by the turning vanes 58 in the axial flow passage 62c, engage the lower turbine blades 48, flow radially outward through the lower radial flow portion 62b, and then through the lower radial nozzle vanes 52, and ultimately back out through the axial flow portion 62a and into the chamber 22.

As a result of this described symmetric flowpath design, the upper and lower turbine blades 48 and 50, the upper and lower radial nozzle vanes 56 and 58, the turbine wheel 36, and/or the shaft 38 may continue to operate regardless of whether the flow is from the wave chamber 22 or to it, thereby supplying continuous rotational shaft energy to the generator 16, or another device. The radial turbine system 12 can thus be described as a self-rectifying radial flow turbine, providing unidirectional rotation of the shaft 38 in response to alternating "forward" and "reverse" (i.e., bi-directional) flow through the flow passage 62 as indicated by arrows 66 and 68 in FIG. 3.

During the exemplary operation of the energy conversion system 10, due at least in part to the above-described symmetric radial flowpath design of the radial turbine system 12, the use of inter-blade row free-vortex sections are allowed to be used to maximum advantage. Moreover, the pure radial flow that the motive fluid undergoes during the operation of the energy conversion system 10 allows the use of two-dimensional blade shapes without any performance penalty; there are no three-dimensional effects or radial flow variations that would be otherwise present in an axial or mixed flow device. Further, the radial inflow of motive fluid into, and the radial outflow of motive fluid from, the radial turbine system 12 allows for an axially compact design that can be readily overhung from the shaft 38. Still further, since motive fluid flows into and out of the radial turbine system 12 radially and perpendicular to the center axis 26, access to the generator 16 and mechanical components such as bearings and/or seals is facilitated. Moreover, the radial turbine system 12 provides a wider range of practical turbine blade hub to tip ratios, which facilitates the scaling of the radial turbine system 12 to commercial sizes.

Figure 5:
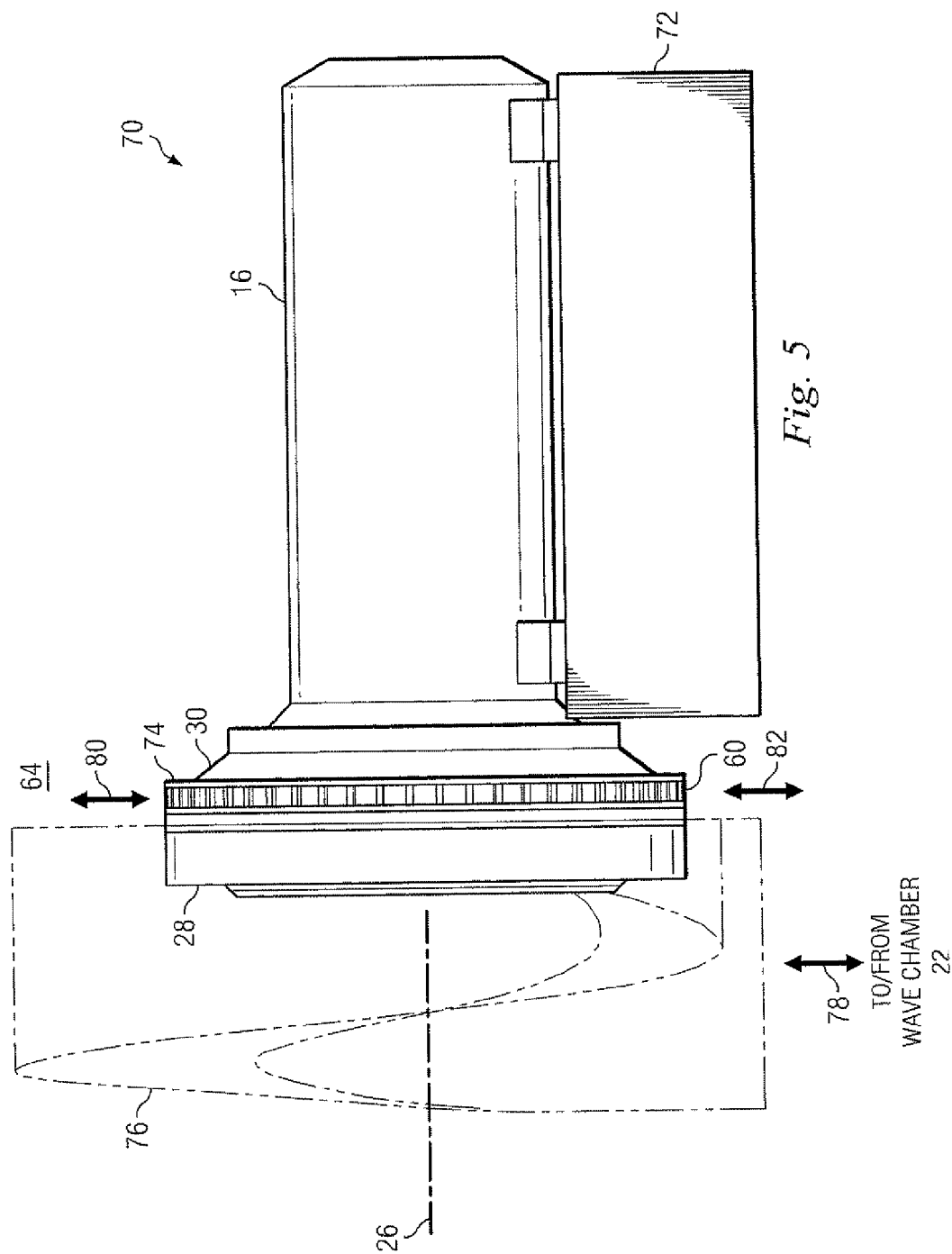
FIG. 5 is an elevation view of another exemplary energy conversion system, in accordance with the disclosure.
Figure 6:
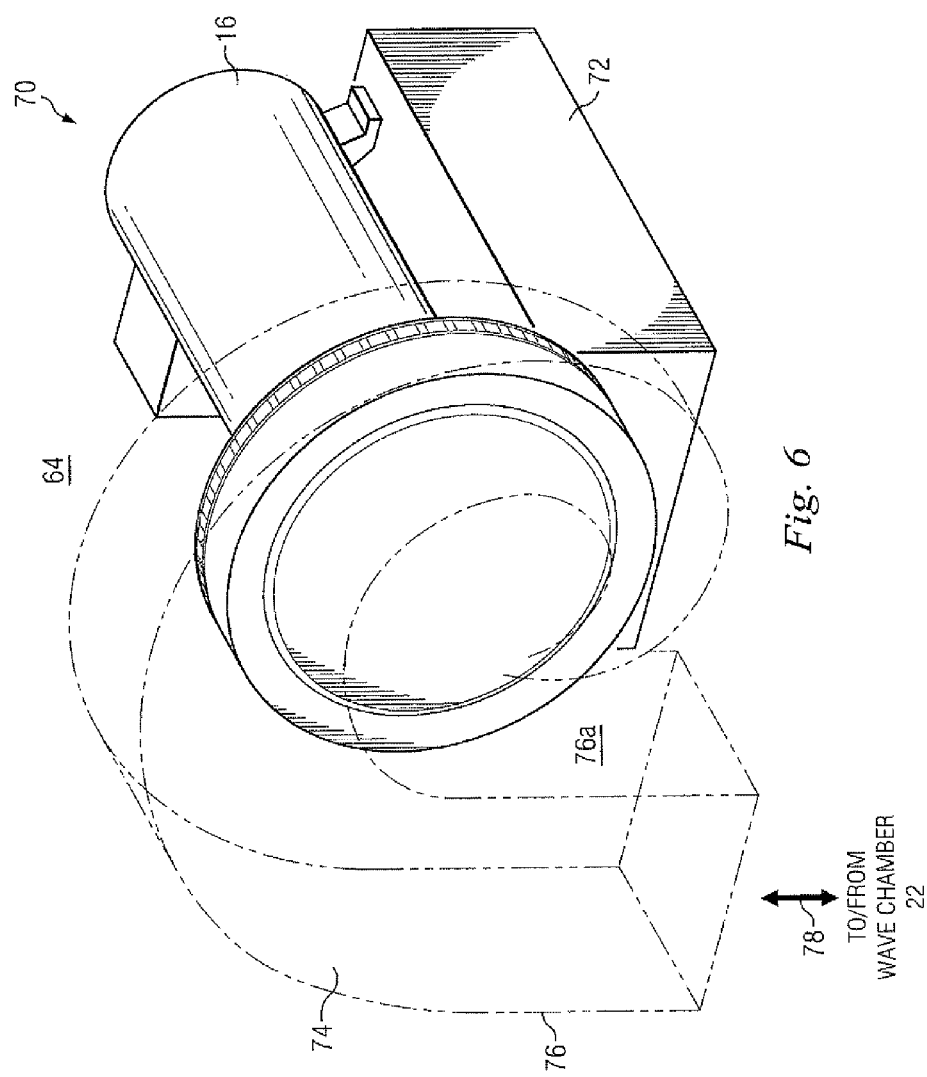
FIG. 6 is a raised perspective view of the energy conversion system of FIG. 5, in accordance with the disclosure.

FIGS. 5 and 6 illustrate an exemplary energy conversion system 70, according to one or more embodiments, which may be similar to one or more embodiments of the energy conversion system 10 described above with reference to FIGS. 1-4. The energy conversion system 70, however, may include a base block 72 on which the generator 16 may be coupled and/or mounted. The base block 72 and the generator 16 may be horizontally oriented, such that the shaft 38 (FIGS. 2 and 3) extends horizontally, rather than vertically. The generator 16 may be operably coupled to a radial turbine system 74, which is similar to the radial turbine system 12 described above with reference to FIGS. 1-4, except that the plurality of lower radial nozzle vanes 52 and lower axial portion 62a may be omitted and replaced with a scroll duct 76 that is coupled to the annular housing 28. Although not shown, in one or more other embodiments, the lower radial nozzle vanes 52 and/or the lower radial portion 62a may be retained, with the scroll duct 76 augmenting the swirling effect of the lower radial nozzle vanes 52. The scroll duct 76 defines a scroll flow passage 76a, which may be, for example, volute shaped. Although not shown, the scroll flow passage 76a may be in fluid communication with the radial flow portion 62b of the flow passage 62, and with the wave chamber 22.

In exemplary operation, with continuing reference to FIGS. 1-6, wave motion occurs in the ocean 18, thereby causing the OWC 14 to oscillate, that is, rise and fall, within the wave chamber 22. When the OWC 14 rises, motive fluid such as, for example, air, within the wave chamber 22 is compressed, causing the motive fluid to flow upwardly in the wave chamber 22 and into scroll flow passage 76a defined by the scroll duct 76. The motive fluid continues to flow through scroll flow passage 76a, with the scroll flow passage 76a causing the motive fluid to swirl and flow axially towards the radial turbine system 74. The swirling air exits the scroll flow passage 76a and flows into the radial flow portion 62b of the flow passage 62. The motive fluid continues to swirl and flow radially-inward towards the inlet of the turbine blades 48 via the lower radial flow portion 62b of the flow passage 62. Thus, the initial swirl generation of the motive fluid flow may be accomplished with the scroll flow passage 76a instead of with the omitted nozzle vanes 52. The remainder of the operation may be substantially the same as that described above with respect to the energy conversion system 10, with the flow proximal the chamber 22 being through the scroll 76 instead of the lower axial flow passage 62a.

In view of the respective operations of the energy conversion systems 10 and 70, as described above, it is clear that the energy conversion systems 10 and/or 70 are easily adaptable to a vertical orientation, a horizontal orientation, and/or any combination thereof, and can take advantage of scroll-style inlet and/or discharge ducting.

Figure 7:
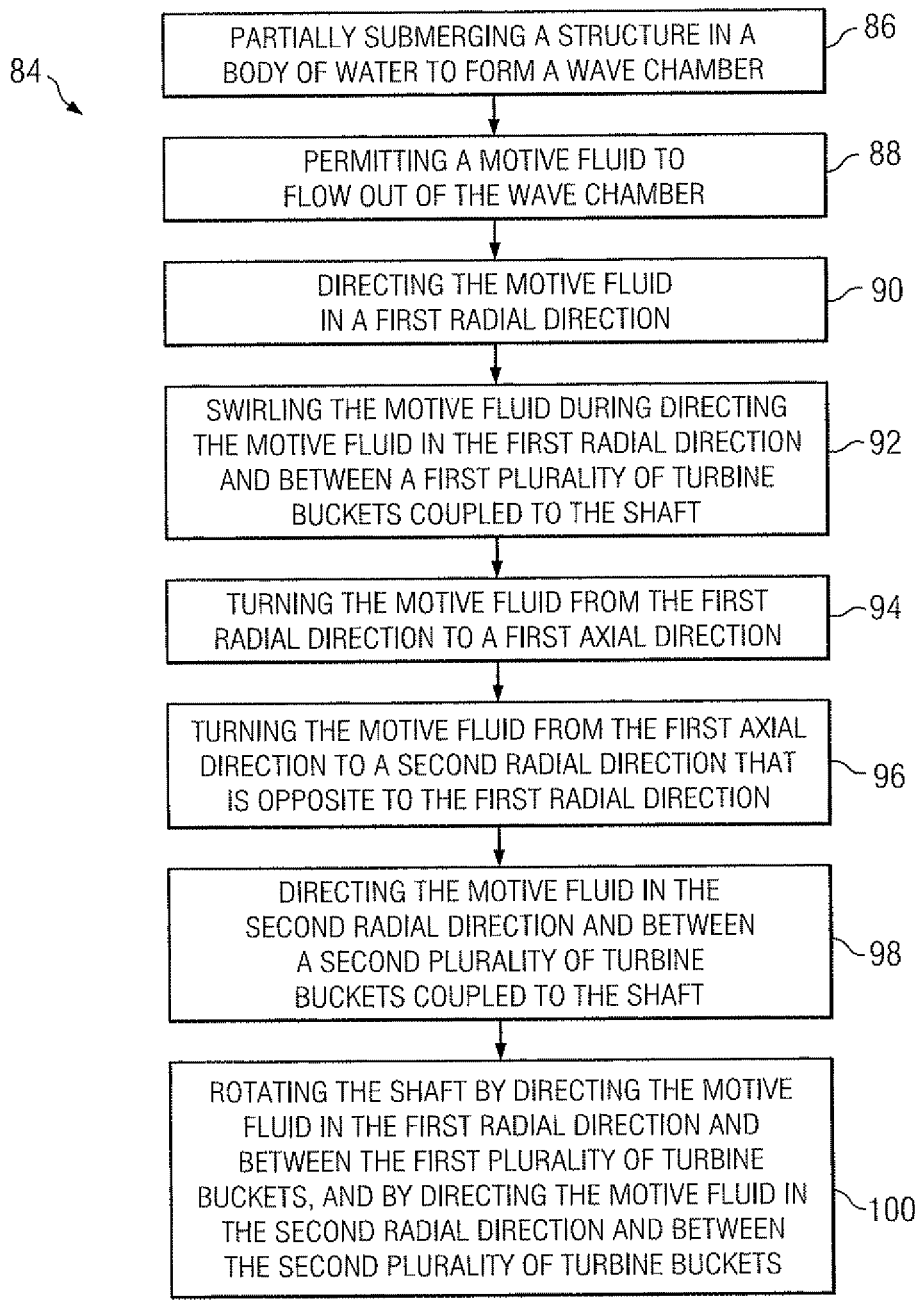
FIG. 7 is a flow chart of an exemplary method of rotating a shaft, in accordance with the disclosure.

FIG. 7 illustrates an exemplary method 84 of rotating a shaft. The method 84 may include partially submerging a structure in a body of water to form a wave chamber, as at 86. The method 84 may also include permitting a motive fluid to flow out of the wave chamber as at 88. The method 84 may proceed to directing the motive fluid in a first radial direction, as at 90, and swirling the motive fluid during directing the motive fluid in the first radial direction and between a first plurality of turbine blades coupled to the shaft, as at 92. The method 84 may also include turning the motive fluid from the first radial direction to a first axial direction, as at 94, and turning the motive fluid from the first axial direction to a second radial direction that is substantially opposite to the first radial direction, as at 96. In one or more embodiments, the method 84 may include directing the motive fluid in the second radial direction and between a second plurality of turbine blades coupled to the shaft, as at 98, and rotating the shaft, as at 100 by directing the motive fluid in the first radial direction and between the first plurality of turbine blades, and by directing the motive fluid in the second radial direction and between the second plurality of turbine blades.

Although the present disclosure has described embodiments relating to specific turbomachinery, it is understood that the apparatus, systems and methods described herein could applied to other environments. For example, according to other exemplary embodiments, instead of, or in addition to wave energy sources, other energy sources may be configured to be used with embodiments of the radial turbine systems described above. For another example, according to other exemplary embodiments, instead of, or in addition to a generator, embodiments of the radial turbine systems described above may be used as drivers for other mechanical devices that require shaft power input such as compressors or pumps. In several exemplary embodiments, various horizontal and/or vertical arrangements of the embodiments of the radial flow turbine systems and generators described above may be implemented in various installations.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of rotating a shaft, comprising:
    directing a fluid from a wave chamber through a first radial flow passage having a decreasing radius;
    swirling the fluid while directing the fluid through the first radial flow passage;
    directing the fluid between a first plurality of impulse turbine blades coupled to the shaft;
    turning the fluid in an axial flow passage after directing the fluid between the first plurality of impulse turbine blades;
    directing the fluid between a second plurality of impulse turbine blades coupled to the shaft after turning the fluid; and
    directing the fluid from the second plurality of impulse turbine blades through a second radial flow passage having an increasing radius.

2. The method of claim 1, wherein swirling the fluid comprises channeling the fluid between a first plurality of nozzle vanes to provide a first exit swirl angle of from 20 degrees to 50 degrees.

3. The method of claim 2, further comprising reversing the flow of the fluid comprising:
    directing the fluid through the second flow passage toward the second plurality of turbine blades;
    swirling the fluid while directing the fluid through the second radial flow passage with the second plurality of nozzle vanes to provide a second exit swirl angle that is equal to the first exit swirl angle;
    directing the fluid past the second plurality of impulse turbine blades into the axial flow passage;
    turning the motive fluid in the axial flow passage;
    directing the fluid from the axial flow passage to the first plurality of impulse turbine blades; and
    directing the fluid through the first flow passage, past the first plurality of nozzle vanes, and to the wave chamber.

4. The method of claim 1, wherein directing the fluid from the second plurality of impulse turbine blades through the second radial flow passage comprises channeling the fluid through a second plurality of nozzle vanes, wherein each nozzle vane of the first and second pluralities of nozzle vanes has a rectangular prism shape.

5. The method of claim 1, wherein swirling the fluid comprises directing the fluid through a scroll duct.

6. An apparatus for converting energy in an oscillating fluid flow into rotational energy, comprising:
    a base disposed proximal a wave chamber;
    a cap having an outer circumference and being spaced apart from the base;
    a turbine wheel attached to a shaft and disposed between the cap and the base, the turbine wheel having first and second rows of impulse turbine blades and a plurality of turning vanes, the first and second rows of impulse turbine blades being separated axially apart, the turbine wheel defining an axial flow passage extending between the first and second rows of impulse blades, and the plurality of turning vanes extending at least partially through the axial flow passage;
    an annular member disposed around the turbine wheel and having first and second members that converge together proximal the turbine wheel, the first member and the cap at least partially defining a first radial flow passage extending from the outer circumference of the cap to the turbine wheel, the second member at least partially defining a second radial flow passage extending from the wave chamber to the turbine wheel; and
    a first plurality of nozzle vanes coupled to the cap and the first member of the annular member and spanning the first radial flow passage, the first plurality of nozzle vanes being substantially rectilinear.

7. The apparatus of claim 6, wherein the first member comprises a volute shaped scroll duct.

8. The apparatus of claim 6, further comprising a second plurality of nozzle vanes coupled to the base and the second member of the annular member and spanning the second flow passage, wherein the first and second pluralities of nozzle vanes are oriented at a substantially uniform angle with respect to a radial line extending from the shaft and are disposed at a first radial distance from the shaft wherein the first and second pluralities of nozzle vanes are substantially identical in shape.

9. The apparatus of claim 8, wherein the first and second rows of impulse turbine blades are offset from the shaft by a second radial distance, the first radial distance being greater than the second radial distance.

10. The apparatus of claim 9, wherein the first radial distance is twice the second radial distance.

11. The apparatus of claim 6, wherein the first and second radial flow passages extend substantially perpendicular to a central axis of the shaft.

12. An energy conversion system, comprising:
an annular member disposed around a shaft and at least partially defining a first radial flow passage that has a decreasing radius and is fluidly coupled to a wave chamber and a second radial flow passage that has an increasing radius and is fluidly coupled to a port;
a first plurality of nozzle vanes disposed around the shaft and extending at least partially through the first radial flow passage, the first plurality of nozzle vanes being configured to impart a first exit swirl angle in a fluid as the fluid proceeds from the wave chamber through the first radial flow passage;
a second plurality of nozzle vanes disposed around the shaft and extending at least partially through the second radial flow passage, the second plurality of nozzle vanes being configured to impart a second exit swirl angle in the fluid as the fluid proceeds through the second radial flow passage; and
a turbine wheel coupled to the shaft, disposed radially between the shaft and the annular member, defining an axial flow passage that is fluidly coupled to the first and second radial flow passages, and including:
a first plurality of impulse blades disposed around the shaft, the first plurality of impulse blades being configured to receive the fluid from the first radial flow passage; and
a plurality of turning vanes disposed in the axial flow passage and extending circumferentially around the shaft, the plurality of turning vanes being configured to turn the flow of fluid at least from one of the first and second radial directions to an axial direction.

13. The energy conversion system of claim 12, wherein the first radial flow passage increases in axial thickness while decreasing in radius, and the second radial flow passage decreases in axial thickness while increasing in radius, such that the first and second radial flow passages each have a constant cross-sectional flow area.

14. The energy conversion system of claim 12, wherein the first and second radial flow passages and the axial flow passage are configured to channel the fluid bi-directionally therein.

15. The energy conversion system of claim 12, wherein the annular member comprises top and bottom members extending radially from a point proximate the turbine wheel, the bottom member at least partially defining the first radial flow passage and the top member at least partially defining the second radial flow passage.

16. The energy conversion system of claim 12, wherein the first and second exit swirl angles are oriented in the same circumferential direction.

17. The energy conversion system of claim 12, wherein the first and second pluralities of nozzle vanes are each offset from the shaft by a radial distance, the radial distance of the first plurality of nozzle vanes being substantially equal to the radial distance of the second plurality of nozzle vanes.

18. The energy conversion system of claim 12, wherein the first and second pluralities of nozzle vanes are each oriented at an angle with respect to a radius extending from the shaft, the angle of the first plurality of nozzle vanes being substantially equal to the angle of the second plurality of nozzle vanes.

19. The energy conversion system of claim 12, wherein the first exit swirl angle is from 20 degrees to 30 degrees and the second exit swirl angle is equal to the first exit swirl angle.

20. The energy conversion system of claim 12, wherein:
the first plurality of impulse blades extends at least partially through the first radial flow passage;
the turbine wheel further comprises a second plurality of impulse blades disposed around the shaft, the second plurality of impulse blades extending at least partially though the second radial flow passage; and
the first and second pluralities of impulse blades each being offset from the shaft by a radial distance, the radial distance of the first plurality of impulse blades being equal to the radial distance of the second plurality of impulse blades.

21. The energy conversion system of claim 20, wherein each blade of the first and second pluralities of impulse blades has a turning angle of from 50 degrees to 70 degrees.

22. The energy conversion system of claim 12, wherein the first plurality of nozzle vanes is radially-offset from the shaft by a first distance and the first plurality of impulse blades is radially-offset from the shaft by a second distance, wherein the first distance is twice the second distance.

23. The energy conversion system of claim 12, wherein the first and second radial flow passages each extend purely radially.

* * * * *